US007938217B2

(12) United States Patent
Stansbury, III

(10) Patent No.: US 7,938,217 B2
(45) Date of Patent: May 10, 2011

(54) REGENERATIVE SUSPENSION WITH ACCUMULATOR SYSTEMS AND METHODS

(75) Inventor: James A. Stansbury, III, Lake Havasu City, AZ (US)

(73) Assignee: Physics Lab of Lake Havasu, LLC, Lake Havasu City, AZ (US)

( * ) Notice: Subject to any disclaimer, the term of this patent is extended or adjusted under 35 U.S.C. 154(b) by 365 days.

(21) Appl. No.: 12/206,082

(22) Filed: Sep. 8, 2008

(65) Prior Publication Data
US 2009/0229902 A1 Sep. 17, 2009

Related U.S. Application Data

(60) Provisional application No. 61/035,494, filed on Mar. 11, 2008.

(51) Int. Cl.
*B60K 25/10* (2006.01)
(52) U.S. Cl. ............... 180/165; 180/65.1; 180/65.29
(58) Field of Classification Search ............. 180/65.1, 180/65.21–22, 65.29, 65.31, 165
See application file for complete search history.

(56) References Cited

U.S. PATENT DOCUMENTS

| | | | |
|---|---|---|---|
| 3,499,163 A | | 3/1970 | Verreault |
| 3,880,250 A * | | 4/1975 | Emanuele ............... 180/65.245 |
| 3,921,746 A | | 11/1975 | Lewus |
| 3,947,744 A | | 3/1976 | Grace et al. |
| 3,980,152 A * | | 9/1976 | Manor ..................... 180/313 |
| 4,009,395 A | | 2/1977 | Long et al. |
| 4,024,926 A * | | 5/1977 | Butoi ..................... 180/65.245 |
| 4,113,047 A * | | 9/1978 | Turner ..................... 180/65.31 |
| 4,218,624 A * | | 8/1980 | Schiavone ................ 290/45 |
| 4,222,450 A | | 9/1980 | Fobbs |
| 4,387,781 A * | | 6/1983 | Ezell et al. ............... 180/65.22 |
| 4,815,575 A * | | 3/1989 | Murty ..................... 188/266.1 |
| 5,077,515 A * | | 12/1991 | St. Arnauld ............. 322/4 |
| 5,091,679 A * | | 2/1992 | Murty et al. ............. 318/153 |
| 5,178,403 A * | | 1/1993 | Kemner et al. .......... 280/423.1 |
| 5,215,156 A | | 6/1993 | Stulbach et al. |
| 5,296,785 A * | | 3/1994 | Miller ..................... 318/254.1 |
| 5,337,560 A * | | 8/1994 | Abdelmalek ............. 60/370 |
| 5,590,734 A * | | 1/1997 | Caires ..................... 180/165 |
| 6,394,238 B1 | | 5/2002 | Rogala |
| 6,460,332 B1 | | 10/2002 | Maruta et al. |
| 6,575,484 B2 | | 6/2003 | Rogala et al. |
| 6,734,575 B2 * | | 5/2004 | Ricketts .................. 290/1 R |
| 6,734,645 B2 * | | 5/2004 | Auerbach ................ 318/139 |
| 6,756,694 B2 * | | 6/2004 | Ricketts .................. 290/1 R |
| 6,828,691 B2 | | 12/2004 | Tu et al. |
| 6,860,332 B1 | | 3/2005 | Archer et al. |
| 6,877,577 B1 | | 4/2005 | Smith |

(Continued)

FOREIGN PATENT DOCUMENTS

WO 2007050526 5/2007

(Continued)

*Primary Examiner* — J. Allen Shriver, II
*Assistant Examiner* — James Triggs
(74) *Attorney, Agent, or Firm* — Snell & Wilmer L.L.P.

(57) ABSTRACT

In exemplary embodiments, a regenerative suspension system replaces or complements a standard shock absorber on a vehicle. A pump attaches via a hose to a central accumulator cylinder that is mounted along the frame rails underneath the vehicle. Pressurized fluid, air, or other material charges the accumulator. The Pressurized fluid, air, or other material is controllably released via a valve in order to perform work.

1 Claim, 6 Drawing Sheets

U.S. PATENT DOCUMENTS

| | | | |
|---|---|---|---|
| 6,920,951 B2 * | 7/2005 | Song et al. | 180/165 |
| 6,949,840 B2 * | 9/2005 | Ricketts | 290/1 R |
| 6,952,060 B2 * | 10/2005 | Goldner et al. | 310/12.13 |
| 6,966,394 B2 | 11/2005 | Fleming | |
| 6,971,232 B2 | 12/2005 | Singh | |
| 7,009,350 B1 * | 3/2006 | Gold | 318/142 |
| 7,087,342 B2 * | 8/2006 | Song et al. | 429/48 |
| 7,143,851 B2 | 12/2006 | Masterson | |
| 7,145,257 B2 * | 12/2006 | Ricketts | 290/1 R |
| 7,147,069 B2 | 12/2006 | Maberry | |
| 7,161,254 B1 * | 1/2007 | Janky et al. | 290/1 R |
| 7,197,871 B2 | 4/2007 | Yoshino | |
| 7,205,732 B1 * | 4/2007 | Gold | 318/142 |
| 7,208,894 B1 | 4/2007 | Earle | |
| 7,211,905 B1 | 5/2007 | McDavid, Jr. | |
| 7,213,665 B2 | 5/2007 | Yamaguchi et al. | |
| 7,239,031 B2 * | 7/2007 | Ricketts | 290/1 R |
| 7,261,170 B2 | 8/2007 | Leifert | |
| 7,261,171 B2 * | 8/2007 | de la Torre et al. | 180/65.31 |
| 7,308,959 B2 | 12/2007 | Roberts | |
| 7,311,163 B2 | 12/2007 | Oliver | |
| 7,361,999 B2 * | 4/2008 | Yeh | 290/1 R |
| 7,408,266 B2 * | 8/2008 | Yeh | 290/1 C |
| 7,615,900 B1 * | 11/2009 | Harris | 310/81 |
| 7,629,700 B2 * | 12/2009 | Begley et al. | 290/1 R |
| 7,638,889 B2 * | 12/2009 | Yeh | 290/1 A |
| 7,703,563 B2 * | 4/2010 | Aldrich et al. | 180/65.265 |
| 2006/0016629 A1 * | 1/2006 | Huard | 180/65.1 |
| 2007/0074918 A1 | 4/2007 | Meyer | |
| 2007/0089924 A1 | 4/2007 | de la Torre et al. | |
| 2007/0273153 A1 | 11/2007 | de la Torre et al. | |

FOREIGN PATENT DOCUMENTS

| | | |
|---|---|---|
| WO | 2007134029 | 11/2007 |
| WO | 2008005667 | 1/2008 |

* cited by examiner

REGENERATIVE SUSPENSION WITH ACCUMULATOR SYSTEMS AND METHODS

CROSS-REFERENCE TO RELATED APPLICATIONS

This application claims the benefit of U.S. Provisional Patent Application Ser. No. 61/035,494, entitled HYDRAULIC/AIR SUSPENSION ENERGY RETURN, filed Mar. 11, 2008, which is incorporated by reference herein in its entirety.

BACKGROUND OF THE INVENTION

Hybrids, semi-tractors and their trailers, locomotives, military and other vehicles have few ways to perform work without burning fuel. In our society, the cost of fuel has been growing more expensive every month. Many people have switched to driving hybrids in order to save money on fuel. In some hybrids and other heavy vehicles, a regenerative suspension system may be used to extend the range of batteries, improve efficiency, and/or reduce the fuel consumption.

There nevertheless still exists a need in the prior art to address regenerative suspension system shortcomings. For example, because variations on driving surfaces are subtle, existing systems do not produce enough hydraulic or pneumatic pressure to efficiently operate motors and electric generators.

SUMMARY OF THE INVENTION

In exemplary embodiments, a regenerative suspension system replaces or complements a standard shock absorber on a vehicle. A pump attaches via a hose to a central accumulator cylinder that is mounted along the frame rails underneath the vehicle. Pressurized fluid, air, or other material charges the accumulator. The accumulator is coupled to a motor via a solenoid valve, or other automatic pressure relief valve, as in air brake systems on tractors, which releases high-pressure fluid or air into the motor. The motor is coupled to an electric generator. The rotating motion of the motor spins the generator shaft. Electricity created by the generator may be fed back into one or more batteries in the vehicle. Thus, the vehicle's battery may be recharged by energy captured from road variation and suspension movement.

BRIEF DESCRIPTION OF THE DRAWINGS

A more complete understanding of the present invention may be derived by referring to the detailed description and claims when considered in connection with the accompanying Figures, where like reference numbers refer to similar elements throughout the Figures, and:

DETAILED DESCRIPTION

Figure 1:
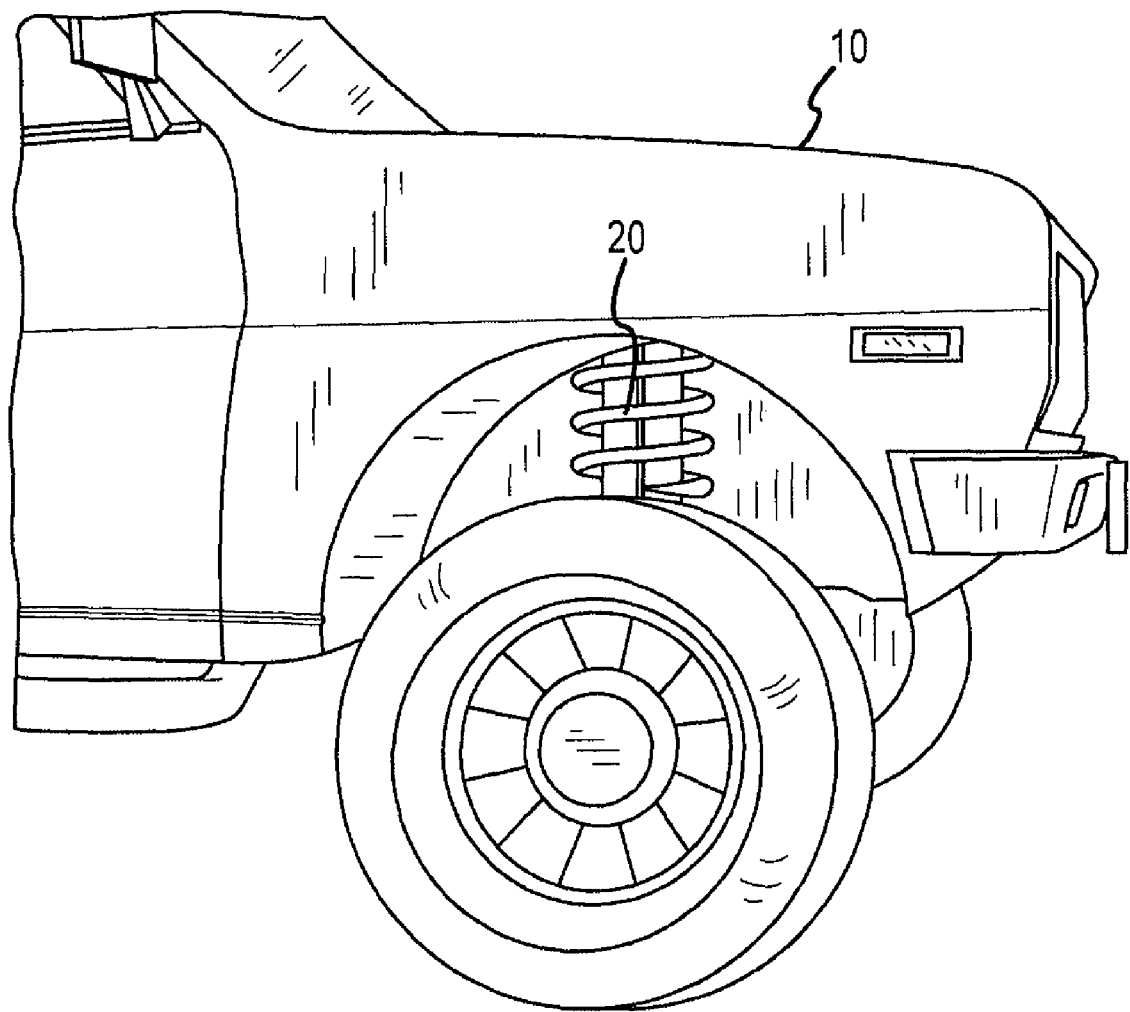
FIG. 1 illustrates a pump on a vehicle in accordance with an exemplary embodiment.

The detailed description of exemplary embodiments herein makes reference to the accompanying Figures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In accordance with exemplary embodiments, a regenerative suspension system comprises an arrangement of components that work together to perform work (e.g., generate electricity) from the reciprocating suspension movement of a vehicle and its weight. In exemplary embodiments, this invention is used in conjunction with SUVs, semi-tractors, military vehicles and locomotives and/or their respective trailers.

In accordance with exemplary embodiments, systems and methods are disclosed herein which may be used in place of fuel combustion engines or in connection therewith. For example, this product may be especially useful for owners of hybrids and plug-in vehicles. In general, anyone can use the systems and methods described herein to perform work without burning fuel.

In accordance with exemplary embodiments, a regenerative suspension system can be utilized by a vehicle to produce electricity via hydraulic or pneumatic shocks. The systems and methods described herein may exploit movement of a shock absorber or other suitable displacement or physical force to pressurize one or more accumulators and generate electricity or other forms of useable power.

In an exemplary embodiment, a regenerative suspension system can be utilized as an electric source to provide electrolysis to aid in increasing fuel mileage, without causing a load on the vehicle's electrical system.

In exemplary embodiments, a regenerative suspension system replaces or complements a standard shock absorber on a vehicle. A pump attaches via a hose to a central accumulator cylinder that is mounted, for example, along the frame rails underneath the vehicle. Pressurized fluid, air, or other material charges the accumulator. The accumulator is coupled to a motor via a solenoid valve, or other automatic pressure relief valve, which releases high-pressure fluid or air into the motor. The motor is coupled to an electric generator. The rotating motion of the motor spins the generator shaft. Electricity created by the generator is fed back into one or more batteries in the vehicle. Thus, the vehicle's battery is recharged by energy captured from road variation and suspension movement. In exemplary embodiments, the fluid or air then returns via a low-pressure hose to a reservoir. From the reservoir, the fluid or air may return to the shock absorber to continue the energy generation process.

In exemplary embodiments, a regenerative suspension system is manufactured as an accessory for existing vehicles. In other exemplary embodiments, a regenerative suspension system is manufactured as an option on new automobiles. The exact dimensions, configuration, and materials used for the systems and methods described herein may vary in accordance with factors such as load application, vehicle size, number of vehicle batteries, vehicle accessories, vehicle speed, vehicle power, vehicle engine configuration, expense of manufacture, and/or the like.

Turning now to the Figures, in accordance with exemplary embodiments, and with reference to FIG. 1, a regenerative suspension system comprises one or more pumps 20. Pumps 20 may be coupled to vehicle 10. While only one pump 20 is illustrated and described for simplicity, one skilled in the art will appreciate that any number of pumps 20 may be used. Moreover, the number of pumps 20 may, but need not necessarily, correspond to the number of wheels on a vehicle. For example, a vehicle having 4 wheels may have 1, 2, 3, 4 or more pumps 20. Moreover, a pump 20 may, but need not necessarily, be located next to a wheel. For example, a pump 20 may be located anywhere along an axle or the drive train. Moreover, a pump 20 may be used in connection with a non-wheeled vehicle, such as a tracked vehicle (e.g. a tank, an armored personnel carrier, a crawler tractor, bulldozer, a snowmobile, a backhoe, an excavator, and the like), a watercraft, a hovercraft, and/or any other moving vehicle or system wherein kinetic energy may be captured and stored.

Further, vehicle 10 may comprise a gasoline engine, a diesel engine, a jet engine, and the like. Moreover, vehicle 10 may comprise, for example, a four-stroke engine, a two-stroke engine, a pistonless rotary engine, and/or a radial engine. Vehicle 10 may also comprise an electric powered vehicle, a fuel cell vehicle, a solar powered vehicle, and/or any other vehicle configured to move across a surface.

In various exemplary embodiments, pump 20 comprises a hydraulic damper or a pneumatic damper. Pump 20 may also be used with a spring. In exemplary embodiments, pump 20 comprises one or more double acting fluid or air cylinders, as illustrated in FIG. 1.

Exemplary fluids for use with a regenerative suspension system include conventional hydraulic fluids (e.g. brake fluids, automatic transmission fluids, and the like). However, any fluid suitable for transferring hydraulic force may be used in accordance with various embodiments. Similarly, while air is referred to herein, nitrogen, helium, argon, and/or any other suitable inert and/or stable gas or gas mixture may be used in place thereof, in accordance with various embodiments.

In exemplary embodiments, pump 20 is coupled to an axle. Thereby, pump 20 exploits compressive forces generated as the tire encounters bumps or other road variations in order to pressurize pump 20. In an exemplary embodiment, pump 20 comprises one or more hydraulic or pneumatic shocks coupled to the wheel, axle or drive train of the vehicle. In another exemplary embodiment, not shown, pump 20 is coupled to an independent shock via a rod or flange and the independent shock is in turn coupled to the wheel, axle or drive train of the vehicle. In yet another exemplary embodiment, pump 20 comprises one or more hydraulic or pneumatic shocks coupled to the hull of a watercraft to pressurize pump 20 as the hull encounters waves or other water variations.

Figure 2:
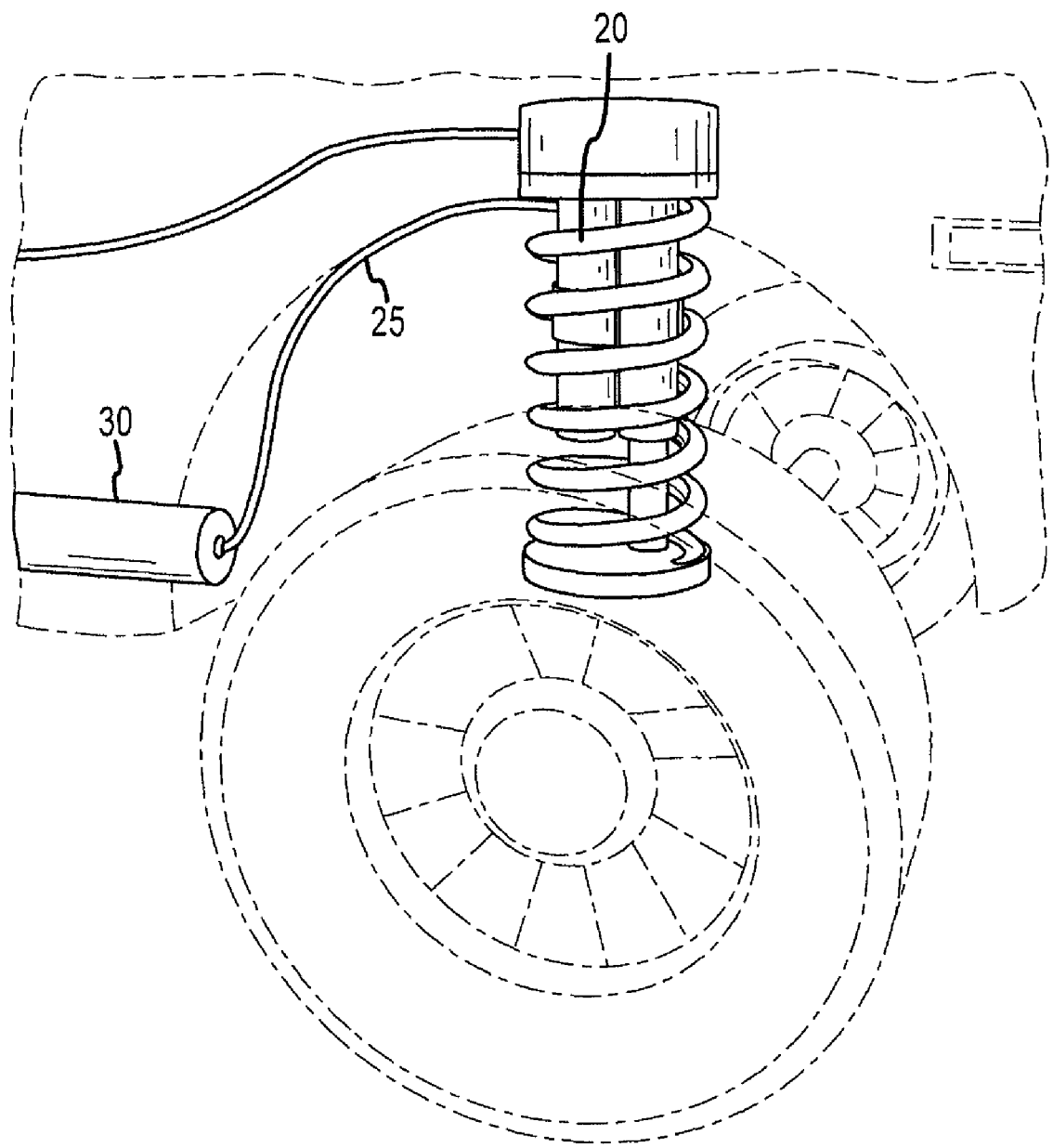
FIG. 2 illustrates a pump and an accumulator in accordance with an exemplary embodiment.

In an exemplary embodiment, and turning to FIG. 2, pressurized fluid or air within pump 20 passes to an accumulator 30 via a conduit 25. In accordance with one aspect of an exemplary embodiment, conduit 25 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 25 comprises one or more one-way or check valves to prevent leakage of fluid or air back into pump 20. In one embodiment, as shown, conduit 25 is coupled to pump 20 at the top thereof, however, it should be appreciated that conduit 25 may be coupled to the middle or bottom of pump 20. Moreover, conduit 25 may be coupled to pump 20 at any suitable location and in any suitable manner configured to allow pressurized fluid or air to exit pump 20 in a controlled manner.

In accordance with exemplary embodiments, accumulator 30 is configured to be charged with fluid as a cylindrical hydraulic accumulator, or with air as an air storage tank. However, accumulator 30 may be suitably configured as a hydraulic accumulator, bladder accumulator, piston accumulator, spring accumulator, and the like, or as any other energy storage unit as known in the art. In accordance with one aspect of an exemplary embodiment, accumulator 30 is configured to be pressurized with fluid or air, e.g, from about 100 to about 1000 pounds per square inch (psi) air and from about 1000 to about 5000 psi fluid. However, accumulator 30 may be configured outside of this range depending on the application and/or weight of the vehicle.

While accumulator 30 may be otherwise configured, accumulator 30 in an exemplary embodiment is located in the main line. In other words, accumulator 30 may be functionally situated/positioned and configured so that all pressurized fluid or air within pump 20 passes directly to accumulator 30 via conduit 25, i.e, before passing to a hydraulic motor or an air motor. This is advantageous because for certain applications, it is more efficient to release high pressure fluid or air sporadically than low pressure fluid or air continuously. And in some embodiments, the most efficient pressure can only be built up over time in an accumulator. This may hold true for example, when using the high pressure fluid or air to turn an electric generator, as described below.

In an exemplary embodiment, accumulator 30 comprises a volume from about 200 cubic inches to about 2000 cubic inches. However, accumulator 30 may be configured outside of this range depending on the application and/or weight of the vehicle. In various other exemplary embodiments, accumulator 30 comprises any suitable volume configured to capture pressurized fluid or air delivered by one or more pumps 20.

While only one accumulator 30 is illustrated and described for simplicity, one skilled in the art will appreciate that any number of accumulators 30 may be used. For example, a single vehicle may have multiple accumulators 30, in parallel or in series, for different applications, as discussed below. In an exemplary embodiment, a regenerative suspension system comprises a high pressure accumulator (e.g., a charging accumulator) and a low pressure accumulator (e.g., a releasing accumulator).

In accordance with exemplary embodiments, accumulator 30 is attached to vehicle 10 along the frame rails underneath vehicle 10. However, accumulator 30 may be located in any suitable area of a vehicle.

In general, any of the components described herein may be coupled to each other via bolts, rivets, dowels, welding, soldering, brazing, adhesives, sleeves, brackets, clips, or any other means known in the art or hereinafter developed. The coupling may be permanent or temporary, and the coupling may include an adjustable coupling, thereby allowing the components to be extended away from each other or closer to each other.

Figure 3:
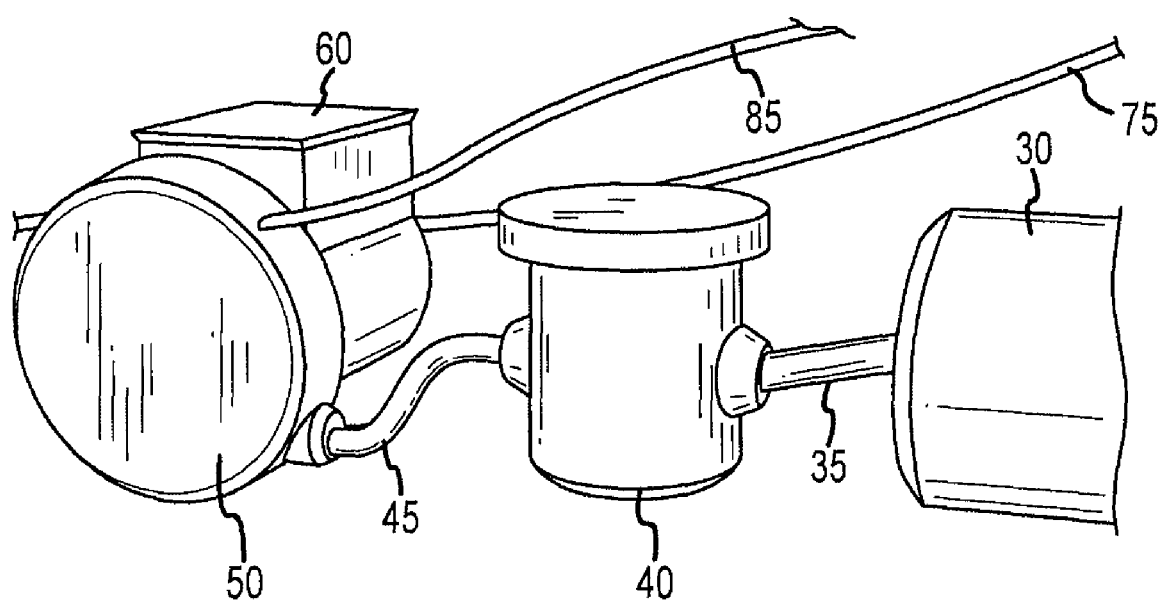
FIG. 3 illustrates a system for charging a battery in accordance with an exemplary embodiment.

In accordance with exemplary embodiments, and turning to FIG. 3, pressurized fluid or air within accumulator 30 passes to a valve 40 via a conduit 35. In accordance with one aspect of an exemplary embodiment, conduit 35 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 35 comprises one or more one-way or check valves to prevent leakage of fluid or air back into accumulator 30.

The high pressure fluid or air bled through valve 40 may be used to perform work in any number of applications, either stand-alone applications or as combinations of applications, some of which are discussed below.

In accordance with exemplary embodiments, valve 40 is configured to open automatically when pressure within accumulator 30 reaches a desired threshold level. In accordance with exemplary embodiments, valve 40 is configured to open when pressure within accumulator 30 reaches from about 100 psi to about 5000 psi. However, valve 40 may be configured outside of this range depending on the application and/or weight of the vehicle. In various exemplary embodiments, valve 40 comprises a one-way check valve, a gate valve, a solenoid valve, or other automatic pressure relief valve, or the like. In various exemplary embodiments, valve 40 is configured to flow fluid at a rate of between about 0.5 gallons per minute to about 6 gallons per minute. In other exemplary embodiments, valve 40 is configured to flow fluid at a rate of between about 2.5 gallons per minute to about 4.5 gallons per minute. However, valve 40 may be configured to flow fluid at any suitable rate configured to allow use of pressure contained within accumulator 30, for example, depending on the application and/or weight of the vehicle.

In an exemplary embodiment, pressurized fluid or air passed through valve 40 is delivered to a motor 50 via a conduit 45. In accordance with one aspect of an exemplary embodiment, conduit 45 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 45 comprises one or more one-way or check valves to prevent leakage of fluid or air back into valve 40.

With continued attention to FIG. 3, and in accordance with exemplary embodiments, motor 50 comprises a hydraulic motor or an air motor (i.e., a reversed air compressor). Motor 50 is rotated by the high pressure fluid or air bled through valve 40. In exemplary embodiments, motor 50 rotates at from about 100 revolutions per minute (rpm) to about 2000 rpm. However, one skilled in the art will appreciate that motor 50 may be configured to rotate at any rate to efficiently capture the kinetic energy from the high pressure fluid or air bled through valve 40.

In an exemplary embodiment, motor 50 transmits kinetic energy to an electric generator 60. In an exemplary embodiment, motor 50 is connected to generator 60 via a pulley system. In various other exemplary embodiments, motor 50 may be coupled to generator 60 via a shared axle, a gearset, a chain, a belt drive, and the like. Moreover, motor 50 may be coupled to generator 60 via any suitable components configured to transmit mechanical power to generator 60. Generator 60 may, but need not necessarily, be co-housed with motor 50.

Figure 4:
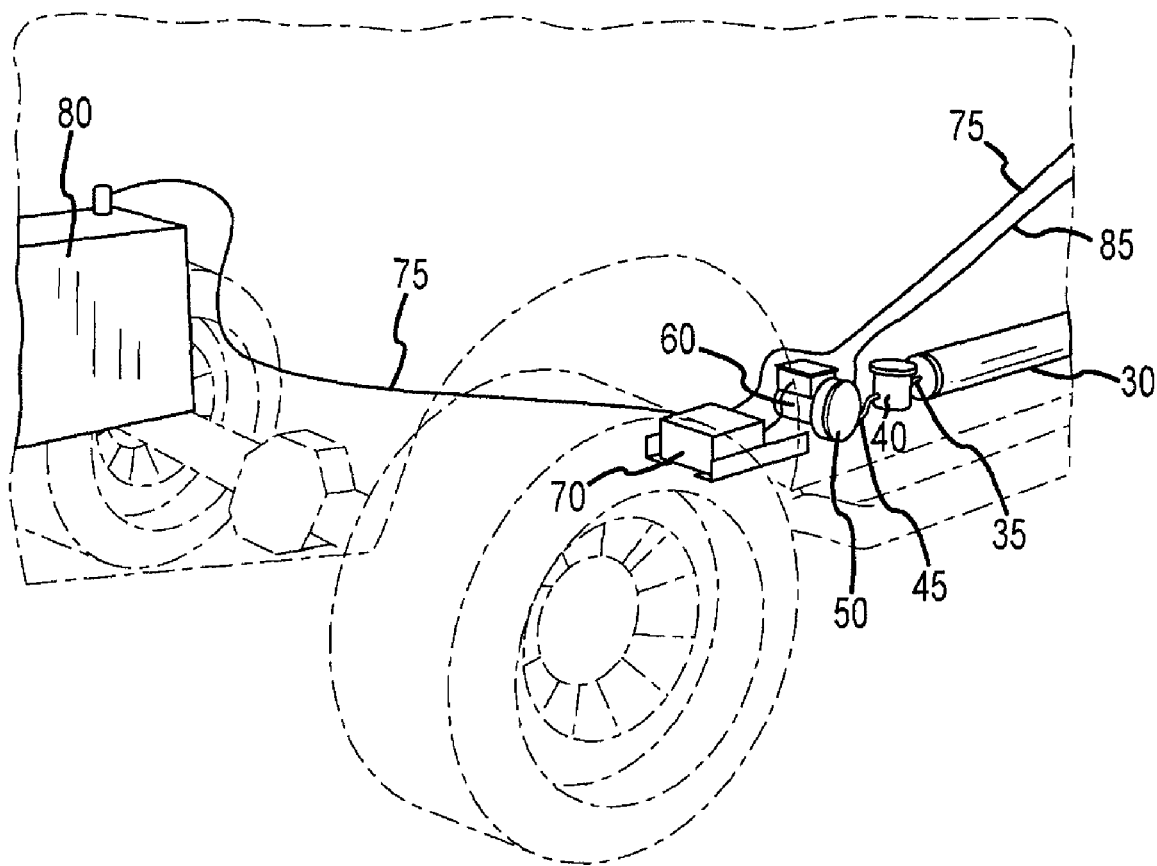
FIG. 4 illustrates another system for charging a battery in accordance with an exemplary embodiment.
Figure 5:
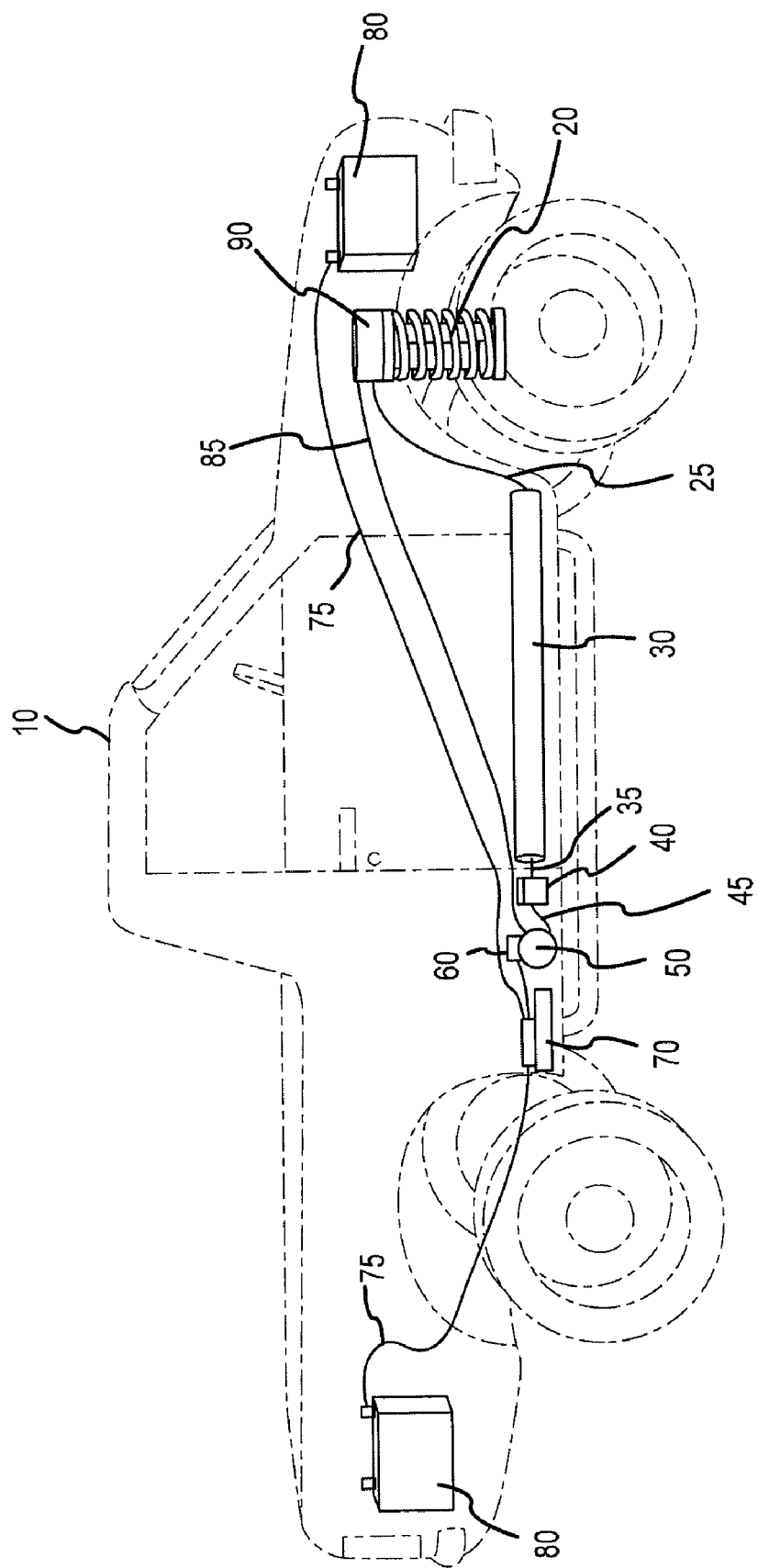
FIG. 5 illustrates a system on a vehicle for charging a battery in accordance with an exemplary embodiment.

In an exemplary embodiment, generator 60 creates electrical power. Optionally, as depicted in FIG. 4, a voltage regulator or other suitable controller 70 is used to regulate voltage between generator 60 and one or more batteries 80. In general, any suitable electronic components may be utilized to control, adjust, monitor, and otherwise regulate delivery of electrical energy from generator 60 to one or more batteries 80. Controller 70 then passes electricity to one or more batteries 80 (i.e., 1, 2, 3, 4, 5, 10, 15, 20, 40, 60 or more batteries) via one or more lines 75, thereby charging one or more batteries 80, as shown in FIG. 5.

Exemplary systems have been tested and depending on the weight of vehicle 10 and other factors, generator 60 is capable of producing, for example, 400-600 watts for every ten minutes of drive time. In an exemplary embodiment having a pump 20 at each of 4 wheels of an SUV of 4,000 pounds or greater, one or more batteries 80 could receive more than 10-15 kilowatts per hour.

In accordance with an exemplary embodiment, motor 50 turns an alternator.

In an exemplary embodiment, one or more batteries 80 are employed as a power source for an electric motor configured to provide power to one or more axles of vehicle 10. In other exemplary embodiments, one or more batteries 80 are employed to power machinery, a power take off ("PTO") shaft, an air compressor, automotive accessories, etc.

In various exemplary embodiments, electrical power created by generator 60 may be used to power electrical components coupled to a vehicle, such as an air conditioner, a light, an arc welder, and/or any other suitable electrical components.

In other embodiments, all or a portion of the electrical power created by generator 60 may be used for electrolysis of water to increase the efficiency of vehicle 10.

In accordance with another exemplary embodiment, valve 40 is configured to open upon demand for electrical power. For example, valve 40 may be configured to open when one or more batteries 80 need charging, during vehicle acceleration or braking, when driving up a steep grade, or when needed to power machinery. However, valve 40 may be configured to open at any suitable time and/or in response to any suitable trigger. Additionally, valve 40 may be configured to open on a scheduled or timed basis.

In accordance with another exemplary embodiment, not shown, motor 50 turns an axle of vehicle 10.

In accordance with yet another exemplary embodiment, not shown, the fluid or air bled from valve 40 is used to directly power machinery, for example, hydraulic machinery such as a hydraulic lift gate.

In accordance with yet another exemplary embodiment, not shown, the fluid or air bled from valve 40 is used to turn a PTO shaft.

In accordance with yet another exemplary embodiment, not shown, the air bled from valve 40 is used to power an air compressor.

In accordance with various other exemplary embodiments, not shown, the fluid or air bled from valve 40 may be used to supercharge and/or turbocharge vehicle 10. Pressurized air released through valve 40 may be directed to the intake area of the engine of vehicle 10 in order to cause forced induction of the engine. Alternatively, pressurized fluid or air released through valve 40 may be utilized to drive a supercharger, such as a positive displacement pump, a dynamic compressor, and the like.

In accordance with yet another exemplary embodiment, not shown, the fluid or air bled from valve 40 may also be used to reduce emissions of vehicle 10. Pressurized air may be directed to the exhaust area of vehicle 10, such as to a catalytic converter, in order to boost the efficiency of the converter. Moreover, because the rate of gaseous reactions tends to increase with pressure, pressurized fluid or air may be utilized to power a system, such as an exhaust gas compressor. In an exemplary embodiment, this may be done in order to obtain more favorable conditions for reduction of undesirable exhaust gas components and/or increase the rate at which undesirable exhaust gas components are removed from the exhaust gas stream.

In exemplary embodiments, and with reference to FIG. 5, the fluid or air bled from valve 40 returns to a reservoir 90 via a conduit 85 (e.g., a low-pressure hose) and is recycled into pump 20 by gravity, suction or residual pressure within valve 40, which may be from about 20 psi to about 200 psi. In accordance with one aspect of an exemplary embodiment, conduit 85 is a rubber (e.g., EPDM, silicone with polyester) synthetic, metal or plastic (e.g., hardened plastic) hose with a fastener, coupling, clamp, bracket, clip or other means known in the art or hereinafter developed, on one or both ends. In accordance with one aspect of an exemplary embodiment, conduit 85 comprises one or more one-way or check valves to prevent leakage of fluid or air back into motor 50. In an exemplary embodiment, reservoir 90 is a central reservoir. In another exemplary embodiment, as illustrated, each pump 20 has a separate reservoir 90. In an exemplary embodiment, conduit 85 provides a cooling effect to surrounding elements.

In various exemplary embodiments, once accumulator 30 has emptied, a vehicle engine, a battery or an auxiliary conventional apparatus will begin to perform the work previously enabled by the fluid or air bled from valve 40.

Figure 6:
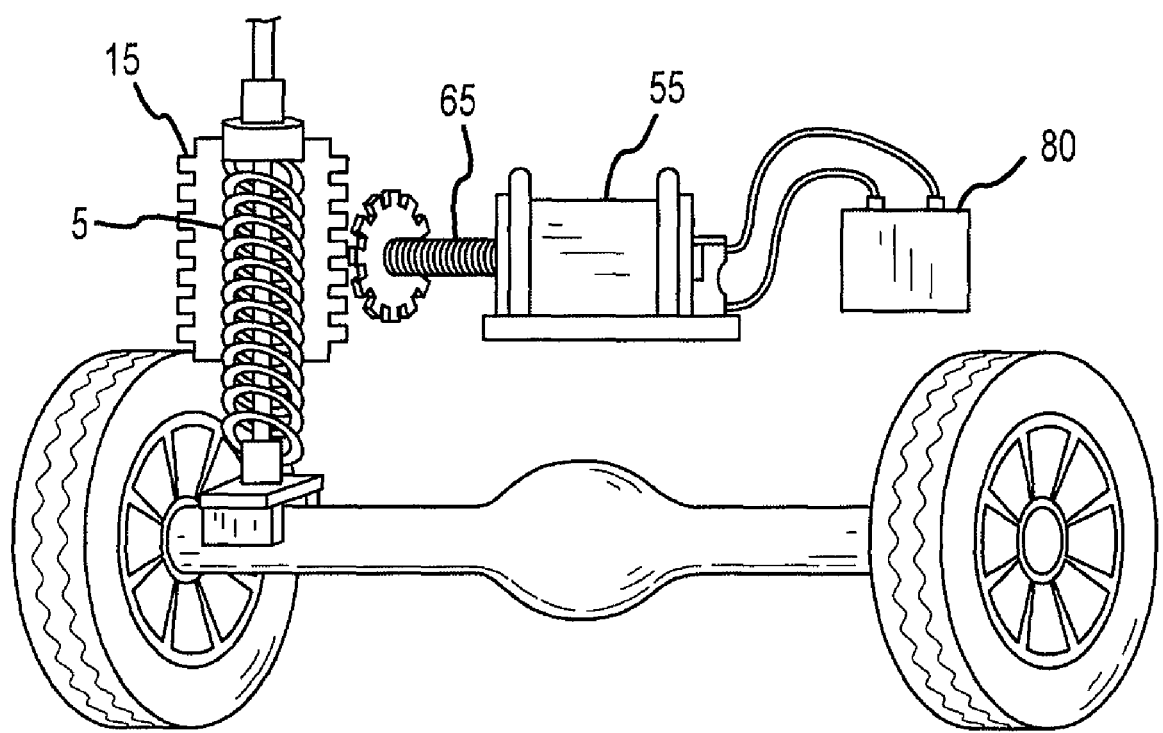
FIG. 6 illustrates a system comprising a motion converter and an energy storage element for charging a battery in accordance with an exemplary embodiment.

It should be understood that other embodiments may be realized and that logical and mechanical changes may be made without departing from the spirit and scope of the invention. For example, in accordance with an exemplary embodiment, and as depicted in FIG. 6, the kinetic energy derived from the vertical, reciprocating motion of a suspension system 5 can be transferred to an energy storage element (e.g., a torsion spring 65, similar to that used with a garage door opener, a flywheel or any other system for storing rotational energy) via a motion converter (e.g., a ratcheted toothed ladder arrangement 15 or any other system for converting linear motion to rotary motion). In the embodiment depicted in FIG. 6, the energy storage element is analogous to accumulator 30. The potential energy stored in the energy storage element can be controllably released and used to perform work, e.g., to turn an alternator 55 and charge a battery 80, or turn a motor, generator, axle, PTO shaft etc.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A system for charging a power supply of a vehicle comprising:
    a central battery, and
    a plurality of regenerative suspension systems, wherein each regenerative suspension system is manufactured as an accessory for said vehicle and comprises:
        a hydraulic fluid piston configured for the pressurization of hydraulic fluid upon the compression of said hydraulic fluid piston,
        a hydraulic fluid storage unit functionally situated and configured to receive hydraulic fluid pressurized by, and dispelled adjacent from the top of, said hydraulic fluid piston,
        a hydraulic motor, and
        a generator,
        wherein said hydraulic motor and said generator are co-housed,
        wherein said pressurized hydraulic fluid rotates said hydraulic motor,
        wherein said hydraulic motor is configured to rotate the shaft of said generator, and
        wherein said generator is configured to charge said central battery.

* * * * *